(12) United States Patent
Rajagopalan

(10) Patent No.: US 6,207,784 B1
(45) Date of Patent: Mar. 27, 2001

(54) GOLF BALL COMPRISING ANIONIC POLYURETHANE OR POLYUREA IONOMERS AND METHOD OF MAKING THE SAME

(75) Inventor: Murali Rajagopalan, South Dartmouth, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 09/123,988

(22) Filed: Jul. 28, 1998

(51) Int. Cl.[7] .................... A63B 37/12; A63B 37/02; C08G 71/02; C08G 71/04
(52) U.S. Cl. .................... 528/71; 528/72; 525/452; 525/453; 525/454; 473/354; 473/355; 473/357; 473/365; 473/372; 473/373; 473/385
(58) Field of Search .................... 525/452, 453, 525/454; 528/71, 72; 473/354, 355, 357, 365, 372, 373, 385

(56) References Cited

U.S. PATENT DOCUMENTS

| | | |
|---|---|---|
| 2,832,696 | 4/1958 | Walles . |
| 2,937,066 | 5/1960 | Walles . |
| 3,097,194 | 7/1963 | Leonard et al. . |
| 3,147,324 | 9/1964 | Ward . |
| 3,264,272 | 8/1966 | Rees . |
| 3,290,276 | 12/1966 | Anderson . |
| 3,454,280 | 7/1969 | Harrison et al. . |
| 3,592,724 | 7/1971 | King et al. . |
| 3,613,957 | 10/1971 | Walles . |
| 3,625,751 | 12/1971 | Walles . |
| 3,629,025 | 12/1971 | Walles . |
| 3,642,728 | 2/1972 | Canter . |
| 3,770,706 | 11/1973 | Walles . |
| 3,819,768 | 6/1974 | Molitor . |
| 3,847,854 | 11/1974 | Carter et al. . |
| 3,856,511 | 12/1974 | Becker et al. . |
| 3,870,841 | 3/1975 | Makowski et al. . |
| 3,877,530 | 4/1975 | Downen . |
| 3,959,561 | 5/1976 | Walles . |
| 4,096,127 | 6/1978 | Schurmann et al. . |
| 4,102,876 | 7/1978 | Brenner et al. . |
| 4,123,061 | 10/1978 | Dusbiber . |
| 4,152,485 | 5/1979 | Mizumura et al. . |
| 4,220,739 | 9/1980 | Walles . |
| 4,255,540 | 3/1981 | Weiss . |
| 4,323,247 | 4/1982 | Keches et al. . |
| 4,431,193 | 2/1984 | Nesbitt . |
| 4,508,309 | 4/1985 | Brown . |
| 4,526,375 | 7/1985 | Nakade . |
| 4,615,914 | 10/1986 | Walles . |
| 4,674,751 | 6/1987 | Molitor et al. . |
| 4,788,103 | 11/1988 | Okita et al. . |
| 4,884,814 | 12/1989 | Sullivan . |
| 4,911,451 | 3/1990 | Sullivan et al. . |
| 4,915,912 | 4/1990 | Walles et al. . |
| 4,955,438 | 9/1990 | Juergens et al. . |
| 5,071,578 | 12/1991 | Ohkubo et al. . |
| 5,085,941 | 2/1992 | Ohkubo . |
| 5,239,010 | 8/1993 | Balas et al. . |
| 5,324,783 | 6/1994 | Sullivan . |
| 5,334,673 | 8/1994 | Wu . |
| 5,484,870 | 1/1996 | Wu . |
| 5,661,207 | 8/1997 | Carlson et al. . |
| 5,691,066 | 11/1997 | Rajagopalan . |
| 5,692,974 | 12/1997 | Wu et al. . |
| 5,733,428 | 3/1998 | Calabria et al. . |
| 5,919,100 | * 7/1999 | Boehm . |

FOREIGN PATENT DOCUMENTS

| | | |
|---|---|---|
| 849058 | 9/1960 | (GB) . |
| 907765 | 10/1962 | (GB) . |

OTHER PUBLICATIONS

Lei et al., 1996, 'Novel Sulphonated Polysiloxane–Urethane Ionomers' Chinese J. of Polymer Sci.; 14, No. 4, p. 295–303.

Wei et al., 1997, 'Synthesis and Properties of Sulfonated Polyurethane Ionomers with Anions in the Polyether Soft Segments', J. of Polymer Sci.; vol. 35, pp225–232.

* cited by examiner

Primary Examiner—David J. Buttner
(74) Attorney, Agent, or Firm—Pennie & Edmonds LLP

(57) ABSTRACT

The invention provides a golf ball having a core, intermediate layer, cover and/or coating comprising in whole or in part of an anionic polyurethane or polyurea ionomer. The anionic polyurethane or polyurea ionomer preferably comprises a sulfonate or carboxylate group. The anionic polyurethane or polyurea ionomer may be blended with conventional materials employed to form golf balls, cores, intermediate layers and covers. The composition can be foamed or unfoamed.

46 Claims, 2 Drawing Sheets

GOLF BALL COMPRISING ANIONIC POLYURETHANE OR POLYUREA IONOMERS AND METHOD OF MAKING THE SAME

FIELD OF THE INVENTION

The invention relates to golf balls and, more particularly, to golf balls having covers, coatings, intermediate layers or cores which comprise an anionic polyurethane or polyurea ionomer and to methods for making the same. Preferably the anionic group(s) are based on carboxylic or sulfonic acid groups. Golf balls produced in accordance with the present invention are characterized by improved properties including increased resiliency, increased distance, abrasion-resistance, cut resistance, and durability.

BACKGROUND OF THE INVENTION

The covers of golf balls are generally made from a variety of materials, such as balata or ionomer resins such as SURLYN® and IOTEK®. Balata, which is a natural or synthetic trans-polyisoprene rubber, is the softest of these cover materials. Balata covered balls are favored by the more highly skilled golfers because the softness of the cover allows the player to achieve spin rates sufficient to more precisely control ball direction and distance, particularly on shorter shots.

However, balata covered balls are expensive and less durable as compared to the other cover materials. In particular, balata covered balls are subject to nicks or cuts as a result of a mis-swung golf club or due to landing on cart paths, etc. and/or contact with rocks, trees, etc. Such nicks or cuts detract from the flight characteristics of such balls, rendering them of little use. Accordingly, cover compositions have been developed in an attempt to provide balls with spin rates and a feel approaching those of balata covered balls, while also providing a golf ball with a higher durability and overall distance.

Ionomer resins have, to a large extent, replaced balata as a cover stock material. Chemically, ionomer resins are a copolymer of an olefin and an alpha, beta ethylenically-unsaturated carboxylic acid having 10–90% of the carboxylic acid groups neutralized by a metal ion. See U.S. Pat. No. 3,264,272. Commercially available ionomer resins include, for example, copolymers of ethylene and methacrylic or acrylic acid. These are sold by E.I. DuPont de Nemours and Co. under the trademark "SURLYN®" and by the Exxon Corporation under the trademark "ESCOR®" and the trademark "IOTEK®". These ionomer resins are distinguished by the type of metal ion, the amount of acid, and the degree of neutralization. Also, Chevron Chemical Co. sells a family of ionomers produced from ethylene acrylate-based copolymers under the trademark "IMAC®".

U.S. Pat. Nos. 3,454,280, 3,819,768, 4,323,247, 4,526, 375, 4,884,814, and 4,911,451 all relate to the use of SURLYN®-type compositions in golf ball covers. However, while SURLYN® covered golf balls as described in the preceding patents possess virtually cutproof covers, they have inferior spin and feel properties as compared to balata covered balls.

In 1986, DuPont introduced two new classes of ionomer resins. One was a sodium and zinc ionomer resin having a low flexural modulus. DuPont suggested using and blending the same with other ionomer resins for making a golf ball cover. Golf ball covers made from these low flexural modulus ionomer resins have improved spin and feel characteristics but relatively low velocity. The other was a lithium ionomer resin which was a copolymer of ethylene and methacrylic acid. These lithium ionomer resins have a very high flexural modulus, typically about 60,000 psi (415 MPa). DuPont suggested that lithium ionomer resins could be used to produce a golf ball cover which would be more cut resistant and harder than a cover made with either sodium or zinc ionomer resins. DuPont also suggested that a golf ball having a cover made from a lithium ionomer resin would go farther, have a higher coefficient of restitution and be less prone to cutting (i.e., more durable) than a golf ball made from other known ionomer resins such as sodium and zinc ionomer resins and blends thereof. DuPont further suggested that lithium ionomer resins could be used in blends with other ionomer resins where they can impart better cut resistance to those other resins.

"The Rules of Golf" by the USGA dictates that no golf ball shall have an initial velocity that exceeds 255 feet (78 m) per second, i.e., 250 feet (76 m) per second with a 2% tolerance when impacted by the USGA test machine under specified conditions. Golf balls with covers made from ionomer resins with a low flexural modulus are significantly below this maximum and, as should be appreciated, all golf ball manufacturers strive to come as close as possible to this limit.

In various attempts to produce an ideal golf ball, the golf industry has blended hard ionomer resins (i.e., those ionomer resins having a hardness of about 60 to about 70 on the Shore D scale as measured in accordance with ASTM method D-2240) with a number of softer polymeric materials, such as softer polyurethanes (see, e.g., U.S. Pat. No. 4,674,751 to Molitor et al.). However, the blends of the hard ionomer resins with the softer polymeric materials have generally been unsatisfactory in that these balls exhibit numerous processing problems. In addition, the balls produced by such a combination are usually short on distance.

In addition, various hard-soft ionomer blends, that is, mixtures of ionomer resins which are significantly different in hardness and/or flexural modulus, have been attempted. U.S. Pat. No. 4,884,814 discloses the blending of various hard methacrylic based ionomer resins with similar or larger quantities of one or more "soft" ionomer methacrylic acid based ionomer resins (i.e., those ionomer resins having a hardness from about 25 to 40 as measured on the Shore D scale) to produce relatively low modulus golf ball cover compositions that are not only softer than the prior art hard ionomer covers but also exhibit a sufficient degree of durability for repetitive play. These relatively low modulus cover compositions were generally comprised of from about 25 to 70% of hard ionomer resins and from about 30 to 75% of soft ionomer resins.

U.S. Pat. No. 5,324,783 discloses golf ball cover compositions comprising a blend of a relatively large amount, e.g., 70–90 wt. %, of hard ionomer resins with a relatively low amount, e.g., 10 to about 25–30 wt. %, of soft ionomers. The hard ionomers are sodium or zinc salts of a copolymer of an olefin having from 2 to 8 carbon atoms and an unsaturated monocarboxylic acid having from 3 to 8 carbon atoms. The soft ionomer is a sodium or a zinc salt of a terpolymer of an olefin having from 2 to 8 carbon atoms, methacrylic acid and an unsaturated monomer of the acrylate ester class having from 1 to 21 carbon atoms.

In order to approximate the characteristics of balata covered balls at lower cost, the art has developed balls having a variety of cover compositions. There are more than fifty commercial grades of ionomers available from DuPont and Exxon with a wide range of properties which vary according to the type and amount of metal cations, molecular weight, composition of the base resin (i.e., relative content of ethylene and methacrylic and/or acrylic acid groups) and additive ingredients such as reinforcements, etc. As noted above, these prior art compositions have a considerably higher cut resistance and durability as compared to balata covered balls. A great deal of research continues in order to develop golf ball cover compositions exhibiting not only improved impact resistance and carrying distance properties produced by the "hard" ionomeric resins, but also the playability (i.e. "spin") characteristics previously associated with the "soft" balata covers, properties which are still desired by the more skilled golfer.

Polyurethane has also been recognized as a useful material for golf ball covers since as early as about 1960. U.S. Pat. No. 3,147,324, filed Oct. 20, 1960, is directed to a method of making a golf ball having a polyurethane cover. This patent disclosed an improved method of covering a golf ball with a liquid urethane polymer which could be applied, set and cured at room temperature or at a temperature that would not damage the tensioned windings of the golf ball center. The curing agents disclosed were diamines, polyols or air moisture. Polyurethane covered golf balls were durable and did not cut as balata balls did while at the same time maintaining the feel of a balata ball.

In the ensuing years following 1960, various companies investigated the usefulness of polyurethane as a golf ball cover material in limited ways. U.S. Pat. No. 4,123,061 issued Oct. 31, 1978 teaches that a golf ball can be made from a polyurethane prepolymer of polyether and a curing agent, such as a trifunctional polyol, a tetrafunctional polyol or a diamine. U.S. Pat. No. 5,334,673 issued Aug. 2, 1994 also discloses polyurethane covered golf balls made from a composition of polyurethane prepolymer and a slow-reacting amine curing agent and/or a difunctional glycol.

The first commercially successful polyurethane covered golf ball appeared on the market with the introduction of Titleist's PROFESSIONAL golf ball in 1993. The principal reason for the delay in bringing polyurethane composition golf ball covers on the market was that it was a daunting engineering task to apply a coating of polyurethane composition to a golf ball core to form a golf ball cover having a uniform thickness.

In particular, the difficulty resided in centering a golf ball core in an amount of polyurethane that was sufficiently cured to keep the core centered while at the same time being insufficiently cured so that the cover material could be molded around the core. This problem was essentially solved and a commercially successful polyurethane covered golf ball appeared on the market with the introduction of the aforesaid PROFESSIONAL polyurethane covered golf ball in 1993. A preferred method for centering the core is disclosed in U.S. Pat. No. 5,733,428.

Unlike SURLYN golf balls, polyurethane golf balls do possess the feel of balata golf balls. However, golf ball covers made from polyurethane have not up to the present, fully matched SURLYN golf balls in respect of resilience or the rebound or damping behavior of the golf ball cover which is a function of the initial velocity of a golf ball after impact with a golf club.

Polyureas have also been proposed as cover materials for golf balls. For instance, U.S. Pat. No. 5,484,870 issued Jan. 16, 1996 discloses a polyurea composition comprising the reaction product of an organic diisocyanate and an organic amine, each having at least two functional groups. Like polyurethanes, polyureas are not completely comparable to SURLYN golf balls with respect to resilience or the rebound or damping behavior of the golf ball cover.

To improve the playing characteristics of polyurethane covered golf balls, the use of cationic polyurethane ionomers has been proposed in U.S. Pat. No. 5,691,066. Although, the inclusion of cationic polyurethane ionomers in a golf ball cover can further increase the resilience of the ball, there seems to be a limitation in this approach due to the limited choice of suitable alkylating agents used in the processing of such cationic polyurethanes.

Therefore, none of the prior art teaches a solution to the continuing problem of providing a golf ball with an industry acceptable covers suitable for use under rigorous conditions. In view of the problem caused by the cutting, scratching, and abrasion of the covers of golf balls, there exists a need for golf ball covers that are capable of providing improved resilience, and cut and abrasion resistance and adherence without adversely affecting overall golf ball performance characteristics.

SUMMARY OF THE INVENTION

The invention is directed to a golf ball having at least one layer formed of an anionic ionomer comprising a thermoplastic or thermoset polyurethane, polyurea, or copolymers thereof having an anionic group ("anionic polyurethane/polyurea ionomer"). The anionic group can be based on a carboxylic, sulfonic or phosphoric acid group.

While the anionic polyurethane/polyurea ionomer will generally be used in forming some or all of the cover of the golf ball, it may also or alternatively comprise some or all of the core, and/or an intermediate layer(s) (e.g., a "mantle") and/or coating for the cover. In accordance with the invention, the anionic polyurethane/polyurea ionomer comprises from 1 to 100% by weight of the core, intermediate layer, cover and/or coating of the golf ball.

In particular, the present invention is directed to a golf ball core, intermediate layer(s), cover layer and/or coating comprising an anionic polyurethane or polyurea ionomer.

A "cover" or a "core" as these terms are used herein may be formed from a single layer or from two or more layers, and, thus, may comprise a plurality of layers. As used herein, a core comprising a single layer means a unitary or one-piece core, and the layer includes the entire core from the center of the core to its outer periphery. A core, whether formed from a single layer or from two or more layers may serve as a center for a wound ball. An intermediate layer may be incorporated, for example, with a single layer or multi-layer cover, with a single layer or multilayer core, with both a single layer cover and core, or with both a multilayer cover and a multilayer core. Intermediate layers of the type described above are sometimes referred to in the art, and, thus, herein as well, as an inner cover layer, an outer core layer, or as a mantle layer.

The invention is directed in a first embodiment to one-piece golf balls comprising an anionic polyurethane ionomer, anionic polyurea ionomer or copolymer thereof (hereinafter these ionomers and their copolymers will be referred to as "anionic polyurethane/polyurea ionomer") and, in alternate embodiments, two-piece and multi-piece golf balls comprising at least one cover layer and a core, wherein the at least one cover layer comprises an anionic polyurethane/polyurea ionomer, as well as golf balls that comprise cores or covers having two or more layers optionally formed of this material.

More particularly, the present invention is directed, in a first embodiment, towards golf balls comprising at least a cover and at least one core layer wherein the cover is formed from compositions comprising at least one anionic polyurethane/polyurea ionomer.

The present invention is further directed in a second embodiment towards golf balls comprising a cover, a core (of one or more layers) and at least one intermediate layer interposed between the cover and at least one core layer, wherein the intermediate layer is formed from a composition comprising at least one anionic polyurethane/polyurea ionomer.

The present invention is yet further directed in a third embodiment towards a golf ball comprising a cover, a core and at least one intermediate layer interposed between the cover and the core, wherein the cover and at least one intermediate layer are both formed from a composition comprising at least one anionic polyurethane/polyurea ionomer.

Additionally, the invention is yet further directed in a fourth embodiment towards a golf ball comprising at least a cover and a core, and optionally one or more intermediate layers interposed between the cover and the core, wherein the core is formed from a composition comprising at least one anionic polyurethane/polyurea ionomer. Optionally, the cover and/or the intermediate layer(s) may also be formed from a composition comprising at least one anionic polyurethane/polyurea ionomer.

Furthermore, in another embodiment a golf ball can have a coating over its cover, wherein the coating comprises at least one anionic polyurethane/polyurea ionomer.

In the golf ball cover embodiment of the present invention, the anionic polyurethane/polyurea ionomer preferably comprises from 10 to 90% by weight of the cover while 90 to 10 weight % of the cover is comprised of one or more conventional, ionomeric and/or non-ionomeric polymers.

The present invention also provides a method of enhancing the resilience as well as the cut and abrasion resistance of a golf ball. The method comprises the steps of forming a golf ball core by conventional means and subsequently forming a cover around the core by either compression molding preformed half-shells of cover stock material comprising an anionic polyurethane/polyurea ionomer about the core or by injection molding cover stock material comprising an anionic polyurethane/polyurea ionomer about the core. The present invention can also be practiced as described in U.S. Pat. Nos. 5,334,673, 5,484,870, and 5,733,428. Golf balls that are manufactured in this manner will have resilience, distance as well as cut and abrasion resistance superior to otherwise similar golf balls without an anionic polyurethane/polyurea ionomer in their covers.

Moreover, as noted the present invention is also directed to a method for forming a golf ball having an intermediate layer and/or the core made from a material comprising an anionic polyurethane/polyurea ionomer. The ball is completed by forming a cover over the intermediate layer and/or core.

Further in accordance with the present invention, the anionic polyurethane/polyurea ionomer may be optionally blended with at least one additional thermoplastic ionomer and/or with at least one non-ionomeric thermoplastic resin.

The novel golf ball of the present invention offers improved performance in comparison to golf balls disclosed in the prior art which lack the anionic polyurethane/polymer ionomer component providing, for instance, improved abrasion-resistance, cut-resistance, and durability. Further these balls may also provide enhanced distance (i.e., resilience) without adversely affecting, and in many instances while improving, their "playability" characteristics, i.e., spin, compression, etc.

DESCRIPTION OF THE PREFERRED EMBODIMENTS

Figure 1:
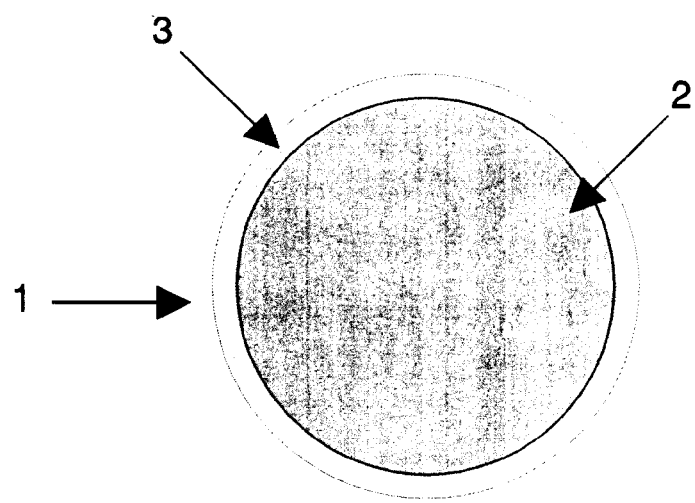
FIG. 1 is a cross-sectional view of a two-piece golf ball wherein the cover is formed from a composition comprising at least one anionic polyurethane/polyurea ionomer.

Broadly, the present invention contemplates a golf ball comprising an anionic polyurethane/polyurea ionomer. The ball may be a one-piece ball formed from a homogeneous mass consisting entirely of such materials, or including blends of conventional golf ball cover materials, such as those discussed hereinbelow, with an anionic polyurethane/polyurea ionomer.

One-piece balls will generally have a dimple pattern molded therein. One-piece balls in accordance with the present invention are quite durable, but do not provide great distance because of relatively high spin and low velocity.

A more preferred aspect of the present invention comprises two-piece, multilayer and/or wound balls having cores, intermediate layers, covers and/or coatings comprising an anionic polyurethane/polyurea ionomer of the type disclosed herein.

Anionic Polyurethane/Polyurea Ionomers

The polyurethane and polyurea ionomers of the invention include anionic moieties or groups. Typically, such groups are incorporated onto the diisocyanate or diisocyanate component of the polyurethane or polyurea ionomers. The anionic group can also be attached to the polyol or amine component of the polyurethane or polyurea, respectively. Preferably, the anionic group is based on a sulfonic, carboxylic or phosphoric acid group. Also, more than one type of anionic group can be incorporated into the polyurethane or polyurea.

Examples of anionic polyurethane ionomers with anionic groups attached to the diisocyanate moiety can have a chemical structure according to the following formula:

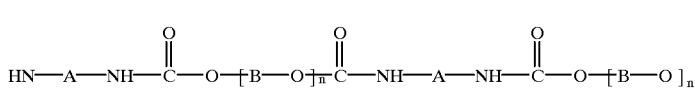

(I)

where
  A=R-Z-M$^{+x}$
  R=a straight chain or branched aliphatic group, a substituted straight chain or branched aliphatic group, or an aromatic or substituted aromatic group
  Z=SO$_3^-$, CO$_2^-$ or HPO$_3^-$
  M=a group IA, IB, IIA, IIB, IIIA, IIIB, IVA, IVB, VA, VB, VIA, VIB, VIIB or VIIIB metal
  x=1 to 5
  B=a straight chain or branched aliphatic group, a substituted straight chain or branched aliphatic group, or an aromatic or substituted aromatic group
  n=1 to 100 Preferably, M$^{+x}$ is one of the following: Li$^+$, Na$^+$, K$^+$, Mg$^{+2}$, Zn$^{+2}$, Ca$^{+2}$, Mn$^{+2}$, Al$^{+3}$, Ti$^{+x}$, Zr$^{+x}$, W$^{+x}$ or Hf$^{+x}$.

Exemplary anionic polyurethane ionomers with anionic groups attached to the polyol component of the polyurethane are characterized by the following chemical structure:

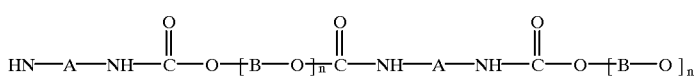

(I)

where
  A=a straight chain or branched aliphatic group, a substituted straight chain or branched aliphatic group, or an aromatic or substituted aromatic group B=R-Z-M$^{+x}$
  R=a straight chain or branched aliphatic group, a substituted straight chain or branched aliphatic group, or an aromatic or substituted aromatic group
  Z=SO$_3^-$, CO$_2^-$ or HPO$_3^-$
  M=a group IA, IB, IIA, IIB, IIIA, IIIB, IVA, IVB, VA, VB, VIA, VIB, VIIB or VIIIB metal
  x=1 to 5
  n=1 to 100
  Preferably, M$^{+x}$ is Li$^+$, Na$^+$, K$^+$, Mg$^{+2}$, Zn$^{+2}$, Ca$^{+2}$, Mn$^{+2}$, Al$^{+3}$, Ti$^{+x}$, Zr$^{+x}$, W$^{+x}$ or Hf$^{+x}$.

Examples of suitable anionic polyurea ionomers with anionic groups attached to the diisocyanate component have a chemical structure according to the following formula:

where
  A=R-Z-M$^{+x}$
  R=a straight chain or branched aliphatic group, a substituted straight chain or branched aliphatic group, or an aromatic or substituted aromatic group
  Z=SO$_3^-$, CO$_2^-$ or HPO$_3^-$,
  M=a group IA, IB, IIA, IIB, IIIA, IIIB, IVA, IVB, VA, VB, VIA, VIB, VIIB or VIIIB metal
  x=1 to 5
  B=a straight chain or branched aliphatic group, a substituted straight chain or branched aliphatic group, or an aromatic or substituted aromatic group
  Preferably, M$^{+x}$ is Li$^+$, Na$^+$, K$^+$, Mg$^{+2}$, Zn$^{+2}$, Ca$^{+2}$, Mn$^{+2}$, Al$^{+3}$, Ti$^{+x}$, Zr$^{+x}$, W$^{+x}$ or Hf$^{+x}$.

Suitable anionic polyurea ionomers with anionic groups attached to the amine component of the polyurea are characterized by the following chemical structure:

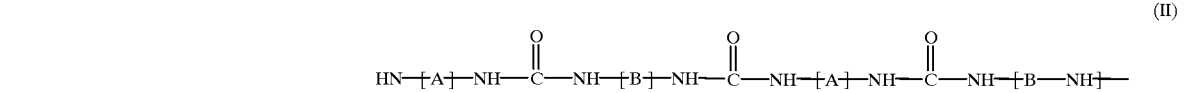

(II)

where
  A=a straight chain or branched aliphatic group, a substituted straight chain or branched aliphatic group, or an aromatic or substituted aromatic group
  B=R-Z-M$^{+x}$
  R=a straight chain or branched aliphatic group, a substituted straight chain or branched aliphatic group, or an aromatic or substituted aromatic group
  Z=SO$_3^-$, CO$_2^-$ or HPO$_3^-$
  M=a group IA, IB, IIA, IIB, IIIA, IIIB, IVA, IVB, VA, VB, VIA, VIB, VIIB or VIIIB metal
  x=1 to 5

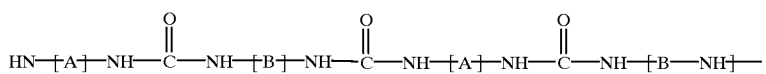

(II)

Preferably, $M^{+x}$ is $Li^+$, $Na^+$, $K^+$, $Mg^{+2}$, $Zn^{+2}$, $Ca^{+2}$, $Mn^{+2}$, $Al^{+3}$, $Ti^{+x}$, $Zr^{+x}$, $W^{+x}$ or $Hf^{+x}$.

Other examples of anionic polyurethane/polyurea ionomers which can be used to make the golf balls of the invention are described in U.S. Pat. Nos. 4,096,127; 4,152,485; 4,788,103; 4,956,438; 5,071,578; 5,085,941; 5,661,207; Lei et al., "Novel Sulphonated Polysiloxane Polyurea-Urethane Iononers", *Chinese J. of Polymer Sci.*, vol. 14, no. 4, pp. 295–303 (1996); Wei et al., "Synthesis and Properties of Sulfonated Polyurethane Ionomers with Anions in the Polyether Soft Segments", *J. of Polymer Sci.*, vol. 35, 225–232 (1997).

The anionic polyurethane/polyurea ionomers can be typically prepared according to two methods. First, the anionic group(s) can be incorporated during a post-polymerization reaction, whereby the anionic group(s) are introduced or attached to the polyurethane/polyurea. More preferably, in a second method, the anionic polyurethane/polyurea ionomer can be made by polymerizing anionic monomer species. One of skill in the art would be aware of other ways to prepare the anionic polyurethane/polyurea ionomers. For instance, a hybrid of the above-described methods can be used. See e.g. U.S. Pat. No. 5,661,207.

To prepare anionic polyurethanes/polyurea ionomers according to the post-polymerization reaction technique, the polyurethane or polyurea is first made. The polyurethane or polyurea is then treated to incorporate the acid groups onto the polyurethane or polyurea substrate. Afterwards, the reaction product is neutralized with a metal salt base.

Polyurethane suitable for use in the post-polymerization reaction are a product of a reaction between a polyurethane prepolymer and a curing agent. The polyurethane prepolymer is a product formed by a reaction between a polyol and a diisocyanate. The curing agent is typically either a diamine or a glycol. Often a catalyst is employed to promote the reaction between the curing agent and the polyurethane prepolymer.

Conventionally, thermoset polyurethanes are prepared using a diisocyanate, such as 2,4-toluene diisocyanate (TDI) or methylenebis-(4-cyclohexyl diisocyanate) (HMDI) and a polyol which is cured with a polyamine, such as methylene dianiline (MDA), or a trifunctional glycol, such as trimethylol propane, or tetrafunctional glycol, such as N,N,N',N'-tetrakis(2-hydroxypropyl)ethylenediamine. However, the present invention is not limited to just these specific types of polyurethanes.

Among the suitable thermoplastic polyurethanes are block copolyurethanes which typically contain blocks of a polyurethane oligomer (material with the higher softening point) alternating with lower softening point blocks of either a polyether oligomer, for a block copoly(ether-urethane), a polyester oligomer for a block copoly(ester-urethane) or a polybutadiene or partially or fully hydrogenated polybutadiene oligomer for a block copoly(butadiene-urethane). The polyether oligomer is typically a polyether macroglycol, such as polytetramethylene ether glycol. The polybutadiene oligomer is a dihydroxy terminated polybutadiene oligomer, which may optionally be partially or fully hydrogenated. The polyurethane block typically consists of 4,4'-diphenylmethane diisocyanate, toluene diisocyanate (any combination of the 2,4- and 2,6-isomers) or para-phenylene diisocyanate, all chain extended with an aliphatic diol, typically 1,4-butanediol. Examples of suitable commercially available thermoplastic polyurethanes include the ESTANE® series from the B.F. Goodrich Company, which includes ESTANE® 58133, 58134, 58144 and 58311; the PELLETHANE® series from Dow Chemical, which includes PELLETHANE® 2102–90A and 2103–70A; ELASTOLLAN® from BASF; DESMOPAN® and TEXIN® from Bayer; and Q-THANE® from Morton International.

Also polyurethanes which are cured with epoxy group containing curing agents can be used. Such polyurethanes are described in co-pending U.S. patent application Ser. No. 08/962,699, filed Nov. 3, 1997, now U.S. Pat. No. 5,908,358 which is hereby incorporated by reference herein.

The polyureas suitable for use in the post-polymerization reaction are typically the reaction product of an organic diisocyanate and an organic amine. Such polyureas are described in U.S. Pat. No. 5,484,870 to Wu. Useful diisocyanates for forming the polyureas include aliphatic, arylaliphatic and aromatic diisocyanates which preferably have an diisocyanate content of at least about 29%, more preferably about 29–34%. Mixtures of diisocyanates can also be used. Examples of suitable diisocyanates include without limitation ethylene diisocyanate, propylene-1,2-diisocyanate, 3,3'-dimethyl-4,4'-biphenylene diisocyanate, toluene-2,4 or 2,6-diisocyanate, and diphenylmethane-4,4'-diisocyanate.

Typical organic amines used to form the polyureas include organic diamines and triamines. Exemplary amine-curing agents include polymethylene-di-p-aminobenzoates, polyethyleneglycol-bis(4-aminobenzoate), N,N,N',N'-tetramethyl-ethylenediamine, and 1,4-diazobicyclo(2,2,2)octane.

To incorporate the anionic groups, the polyurethane or polyurea substrate is exposed to at least one reactant which is capable of introducing anionic groups onto the substrate under conditions well known to those of ordinary skill in the art. Preferably, such reactant will sulfonate, carboxylate or phosphonate, as the case may be, the polyurethane or polyurea substrate.

Sulfonation agents include without limitation $SO_3$, $SO_3$ complexes of Lewis bases, sulfonic acid, sulfuric acid, $SO_2$ with oxygen and a free radical initiator, and acyl sulfate. Other sulfonation agents are well known. General techniques for sulfonation are disclosed in U.S. Pat. Nos. 2,832,696; 2,937,066; 3,592,724; 3,613,957; 3,625,751; 3,642,728; 3,629,025; 3,770,706; 3,847,854; 3,856,511; 3,870,841; 3,877,530; 3,959,561; 4,102,876; 4,220,739; 4,615,914; 4,915,912 and 5,239,010.

For example, an aromatic moiety of the polyurethane or polyurea substrate can be sulfonated with acyl sulfate according to the following mechanism

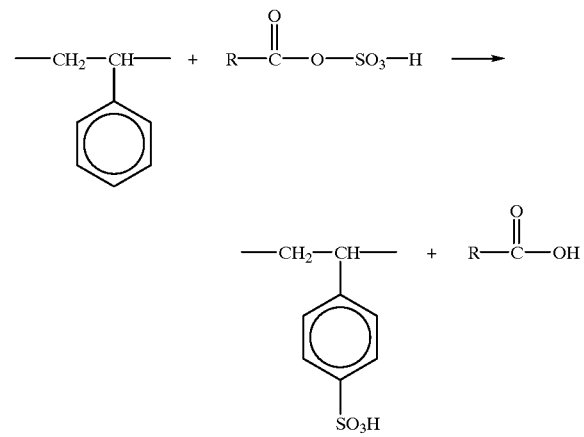

where R=an alkyl group

Carboxylation agents include without limitation polycarboxylic acids such as citric acid, tartaric acid and 1-malic acid, as well as dicarboxylic acids, cyclic carboxylic acid and cyclic dicarboxylic acids.

General techniques for carboxylation are described in U.S. Pat. Nos. 4,096,127; 4,956,438 and 5,661,207. The following is an example of the carboxylation of an aromatic moiety of a polyurethane or polyurea substrate with Grignard reagents.

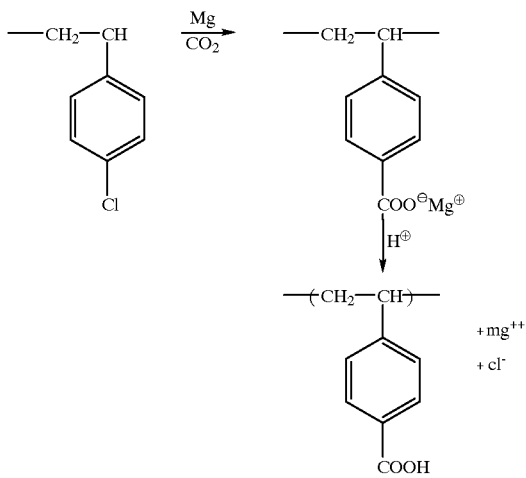

Phosphonation agents include $PCl_3$ and an $AlCl_3$ catalyst, $PCl_3$/oxygen mixtures, dimethyl phosphite and phosphoric acid. One of skill in the art is aware of other suitable phosphonation agents.

General techniques for phosphonation are described in U.S. Pat. Nos. 3,097,194; 3,290,276 and 4,255,540 and in British Patent Nos. 849,058 and 907,765. The following is a example of a mechanism for phosphonation of the polyurethane or polyurea substrate:

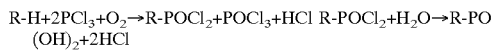

where R=the polyurethane or polyurea substrate.

After the anionic group has been incorporated into the substrate, a metal salt is then added to neutralize the acid groups of the compound. The metal ion of the salt can be those of Group IA, IB, IIA, IIB, IIIA, IIIB, IVA, IVB, VA, VB, VIA, VIB, VIIB and VIIIB metals. Preferred metallic ions of such salts include lithium, sodium, potassium, magnesium, zinc, calcium, manganese, aluminum, tungsten, zirconium, titanium and hafnium.

The sulfonated, carboxylated and/or phosphonated substrate contains from about 0.1 wt % to about 30.0 wt % of combined sulfonate, carboxylate and/or phosphonate groups, which may be present as any or all combinations of sulfonic acid, sulfonate ester, sulfonamide, carboxylic acid, carbonate ester, carboxamide, phosphonic acid, phosphonate ester, and phosphonamide forms.

As noted above, the anionic polyurethane/polyurea ionomers of the invention can also be prepared by copolymerizing anionic monomers. In particular, by reacting anionic groups containing diisocyanates and/or polyols, an anionic polyurethane ionomer can be formed. Suitable anionic diisocyanates include without limitation conventional diisocyanates having an anionic group. Such anionic diisocyanates can be formed by reacting a diisocyanate and an anionic group containing compound as described in U.S. Pat. Nos. 4,956,438 and 5,071,578.

Preferred aromatic diisocyanates include the sulfonated and carboxylated derivatives of diphenylmethane-2,4'-diisocyanate; diphenylmethane-4,4'-diisocyanate (DMI); 3,3'dimethyl-4,4'-biphenylene diisocyanate (TODI); 2,4-toluene diisocyanate (TDI); methylenebis-(4-cyclohexyl diisocyanate) (HMDI); phenylene-1,4-diisocyanate; diphenyl ether 4,4'-diisocyanate; naphthylene-1,5,-diisocyanate (NDI); p-phenylene diisocyanate (PPDI); p,p'-diphenyl diisocyanate; hexahydrophenylene-1,3-diisocyanate; hexahydrophenylene-1,4-diisocyanate; triphenylmethane-4,4',4"-triisocyanate; perhydrodiphenylmethane-2,4'-diisocyanate; and perhydrodiphenylmethane-4,4'-diisocyanate.

Preferred aliphatic diisocyanates include the sulfonated and carboxylated derivatives of ethylene diisocyanate; propylene-1,2- diisocyanate; tetramethylene- 1,4-diisocyanate; hexamethylene-1,6-diisocyanate; dodecane-1,12-diisocyanate; dicyclohexylmethane diisocyanate; cyclobutane-1,3-diisocyanate; cyclohexane-1,3-diisocyanate; cyclohexane-1,4-diisocyanate; 1-isocyanato-3,3,5-trimethyl-5-isocyanatomethylcyclohexane; and 1,3-xylene diisocyanate.

The anionic polyols useful for making anionic polyurethane ionomers include conventional polyols having an anionic group. Examples of such suitable polyols are described in U.S. Pat. No. 5,085,941 and Wei et al., and in "Synthesis and Properties of Sulfonated Polyurethane Ionomers with Anions in the Polyether Soft Segments", J. of Polymer Sci., vol. 35, 225–232 (1997).

Preferred polyols include the sulfonated or carboxylated derivatives of polytetramethylene ether glycol; poly (oxypropylene)glycol; polybutadiene glycol; polyethylene adipate glycol; polyethylene propylene adipate glycol; polybutylene adipate glycol; diethylene glycol initiated caprolactone; 1,4-butanediol initiated caprolactone; trimethylol propane initiated caprolactone; and neopentyl glycol initiated caprolactone.

Shown below is an exemplary mechanism for the making of an anionic polyurethane ionomer, in which the anionic group is attached to the diisocyanate component. The diisocyanate is reacted with a polyol to form a polyurethane prepolymer.

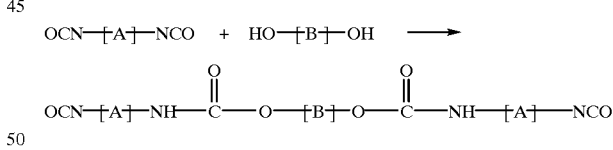

where

A=R-Z-M$^{+x}$

R=a straight chain or branched aliphatic group, a substituted straight chain or branched aliphatic group, or an aromatic or substituted aromatic group z=$SO_3^-$, $CO_2^-$ or $HPO_3^-$ M$^{+x}$=Li$^+$, Na$^+$, K$^+$, Mg$^{+2}$, Zn$^{+2}$, Ca$^{+2}$, Mn$^{+2}$, Al$^{+3}$ B=a straight chain or branched aliphatic group, a substituted straight chain or branched aliphatic group, or an aromatic or substituted aromatic group The following is an exemplary mechanism for the making of a prepolymer of an anionic polyurethane ionomer, in which the anionic group is attached to the polyol. A diisocyanate is reacted with the polyol to form a polyurethane prepolymer.

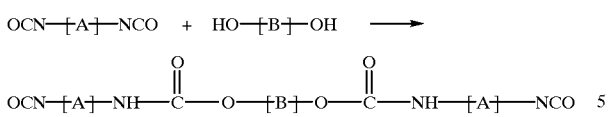

where
B=R-Z-M$^{+x}$
R=a straight chain or branched aliphatic group, a substituted straight chain or branched aliphatic group, or an aromatic or substituted aromatic group
Z=SO$_3^-$, CO$_2^-$ or HPO$^{3-}$
M$^{+x}$=Li$^+$, Na$^+$, K$^+$, Mg$^{+2}$, Zn$^{+2}$, Ca$^{+2}$, Mn$^{+2}$, Al$^{+3}$
A=a straight chain or branched aliphatic group, a substituted straight chain or branched aliphatic group, or an aromatic or substituted aromatic group The prepolymer is then reacted with a curing agent to make an acidic form of the anionic polyurethane ionomer. Suitable curing agents include those discussed earlier in connection with the formation of conventional polyurethanes. Also, persons skilled in the art are aware of additional appropriate curing agents.

Afterwards, a metal base is added to complete the formation of the anionic polyurethane ionomer. Metal bases include compounds such as metal oxides, metal hydroxides, metal carbonates, metal bicarbonates and metal acetates. Suitable metal salts include those described earlier, which were used to neutralize the acidity of the anionic group attached to the polyurethane/polyurea substrate during the post-polymerization reaction.

Similarly, by reacting an organic amine and an anionic group containing diisocyanate or amine, an anionic polyurea ionomer can be prepared. The diisocyanates useful for preparing anionic polyurethane ionomers can also be used to make anionic polyurea ionomers.

Preferred amines used for making the anionic polyurea ionomers include the sulfonated or carboxylated derivatives of polymethylene-di-p-aminobenzoates; polyethyleneglycol-bis(4-aminobenzoates); polydimethylsiloxane-bis(4-aminobenzoates); polytetramethyleneetherglycol-di-p-aminobenzoates; polypropyleneglycol-di-p-aminobenzoates; N,N,N',N'-tetramethyl-ethylenediamine; 1,4-diazobicyclo(2,2,2)-octane; N-methyl-N'-dimethylaminoethylpiperazine; N,N-dimethylbenzylamine; bis-(N,N-diethylaminoethyl)-adipate; N,N-diethylbenzylamine; pentamethyldiethylenetriamine; N,N-dimethylcyclohexylamine; N,N,N',N'-tetramethyl-1,3-butanediamine; N,N-dimethyl-β-phenylethylamine; 1,2-dimethylimidazole and 2-methylimidazole.

The following is an example of a copolymerization reaction of an anionic diisocyanate and an organic amine to form an anionic polyurea ionomer.

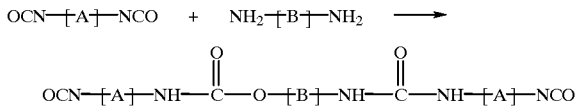

where
A=R-Z-M$^{+x}$
R=a straight chain or branched aliphatic group, a substituted straight chain or branched aliphatic group, or an aromatic or substituted aromatic group
Z=SO$_{3-}$, CO$_2^-$ or HPO$_3^-$
M$^{+x}$=Li$^+$, Na$^+$, K$^+$, Mg$^{+2}$, Zn$^{+2}$, Ca$^{+2}$, Mn$^{+2}$, Al$^{+3}$
B=a straight chain or branched aliphatic group, a substituted straight chain or branched aliphatic group, or an aromatic or substituted aromatic group Cover and Intermediate Layer Compositions In accordance with another embodiment of the present invention, the anionic polyurethane/polyurea ionomer comprises from 1 to 100% by weight of the golf ball cover composition and/or the intermediate layer composition. Unless otherwise stated herein, all percentages are given in percent by weight of the total composition. Preferably, the anionic polyurethane/polyurea ionomer comprises from about 10 to about 90%, more preferably from about 10 to about 75 and most preferably from about 15 to about 40 of the cover composition and/or the intermediate layer composition. About 90 to 10%, more preferably from about 90 to about 25 and most preferably from about 85 to about 60 of the cover and/or the intermediate layer composition is comprised of one or more other polymers such as, but not limited to non-polyurethane/polyurea ionomers, non-anionic polyurethanes or polyureas, epoxy resins, polyethylenes, polyamides and polyesters, polystyrenes, polycarbonates, polyacrylics.

For example, such additional polymers may include ionomers such as the SURLYN®, ESCOR®, IOTEK®, and IMAC® copolymers described above. Such ionomers are obtained by providing thermolabile ionic crosslinking to polymers of monoolefin with at least one member selected from the group consisting of unsaturated mono- or di-carboxylic acids having 3 to 12 carbon atoms and esters thereof (the polymer contains 1 to 50% by weight of the unsaturated mono- or di-carboxylic acid and/or ester thereof). More particularly, such acid-containing ethylene copolymer ionomer component includes E/X/Y terpolymers where E is ethylene, X is a softening comonomer such as acrylate or methacrylate present in 0–50 (preferably 0–25, most preferably 0–20), weight percent of the polymer, and Y is acrylic or methacrylic acid present in 5–35 (preferably 10–35, more preferably at least about 16–35, most preferably at least about 16–20) weight percent of the polymer, wherein the acid moiety is neutralized 1–90% (preferably at least 40%, most preferably at least about 60%) to form an ionomer by a cation such as lithium, sodium, potassium, magnesium, calcium, barium, lead, tin, zinc or aluminum, or a combination of such cations. Specific acid-containing ethylene copolymers include ethylene/acrylic acid, ethylene/methacrylic acid, ethylene/acrylic acid/n-butyl acrylate, ethylene/methacrylic acid/n-butyl acrylate, ethylene/methacrylic acid/iso-butyl acrylate, ethylene/acrylic acid/iso-butyl acrylate, ethylene/methacrylic acid/n-butyl methacrylate, ethylene/acrylic acid/methyl methacrylate, ethylene/acrylic acid/methyl acrylate, ethylene/methacrylic acid/methyl acrylate, ethylene/methacrylic acid/methyl methacrylate, and ethylene/acrylic acid/n-butyl methacrylate. Preferred acid-containing ethylene copolymers include ethylene/methacrylic acid, ethylene/acrylic acid, ethylene/methacrylic acid/n-butyl acrylate, ethylene/acrylic acid/n-butyl acrylate, ethylene/methacrylic acid/methyl acrylate and ethylene/acrylic acid/methyl acrylate copolymers. The most preferred acid-containing ethylene copolymers are ethylene/methacrylic acid, ethylene/acrylic acid, ethylene/(meth)acrylic acid/n-butyl acrylate, ethylene/(meth)acrylic acid/ethyl acrylate, and ethylene/(meth)acrylic acid/methyl acrylate copolymers.

The manner in which such ionomers are made is well known in the art as described in, e.g., U.S. Pat. No. 3,262,272.

As mentioned above, other suitable materials for forming the cover and/or intermediate layers, i.e., for use in combination with anionic polyurethane/polyurea ionomers, include non-anionic polyurethanes or polyureas, epoxy resins, polyethylenes, polyamides and polyesters. For example, the cover and/or intermediate layer may be formed from a blend of at least one anionic polyurethane/polyurea ionomer and thermoplastic or thermoset non-anionic urethanes/polyurethanes, cationic urethane ionomers and urethane epoxies, polyureas and blends thereof. Examples of suitable urethane ionomers are disclosed in U.S. Pat. No. 5,692,974 entitled "Golf Ball Covers", the disclosure of which is hereby incorporated by reference in its entirety in the present application. Other examples of suitable polyurethanes are described in U.S. Pat. No. 5,334,673. Examples of appropriate polyureas are discussed in U.S. Pat. No. 5,484,870 and examples of suitable polyurethanes cured with epoxy group containing curing agents are disclosed in co-pending U.S. patent application No. 08/962,699, filed Nov. 3, 1997, now U.S. Pat. No. 5,902,358 which is a file wrapper continuation of U.S. application No. 08/482,524 filed Jun. 7, 1995.

The cover and/or intermediate layers may also be formed of a blend of at least one oxa acid compound or polyamide with the composition of the invention. Among the polyamide components useful in forming the blends of this invention are nylons. The polyamide component can be comprised of a homopolymer, a copolymer, a block copolymer or a blend of two or more variations of any types of polyamides.

Polyamide homopolymers and copolymers are produced by two common methods. In the first, a compound containing one organic acid-type end group and one amine end group is formed into a cyclic monomer. The polyamide is then formed from the monomer by a ring-opening addition polymerization.

These polyamides are commonly designated as nylon 6, nylon 11, nylon 12, etc., where the number indicates the number of carbon atoms making up the ring in the monomer. The second method involves the condensation polymerization of a dibasic acid and a diamine. These polyamides are commonly designated as nylon 4,6, nylon 6,6, nylon 6,9, nylon 6,10, nylon 6,12, etc., where the first number indicates the number of carbon atoms connecting the two amine groups in the diamine and the second number indicates the number of carbon atoms connecting the two acid groups in the dibasic acid, including those in the acid groups. Additionally, polyamide copolymers are produced by blending two or more polyamide melts and holding the materials in the molten state for a sufficient time period such that partial or full randomization occurs.

Polyamide copolymers are commonly designated by separating the symbols for the homopolymers by the symbol "/". For the purposes of this application, the component named first can be either the major or a minor component of the copolymer.

Preferred polyamide homopolymers and copolymers include nylon 4, nylon 6, nylon 7, nylon 11, nylon 12, nylon 13, nylon 4,6, nylon 6,6, nylon 6,9, nylon 6,10, nylon 6,12, nylon 12,12, nylon 13,13 and mixtures thereof. More preferred polyamide homopolymers include nylon 6, nylon 11, nylon 12, nylon 4,6, nylon 6,6, nylon 6,9, nylon 6,10, nylon 6,12 and mixtures thereof.

Block polyamide copolymers are materials which contain main-chain blocks or segments of polyamide or copolyamide separated by main-chain blocks of a different polymer. The separating polymer block may be a polyether, such as a poly(alkylene oxide). When poly(ethylene oxide) is used as the separating polymer block, this material is a copolyetheramide block copolymer known commercially as PEBAX®, available from Elf-Atochem, or ARNITEL®, available from DSM.

Epoxy resins suitable for combining with an anionic polyurethane/polyurea ionomer for forming the cover and/or intermediate layers are typically formed by the reaction of bisphenol A (b) and epichlorohydrin (a) according to the reaction set forth below:

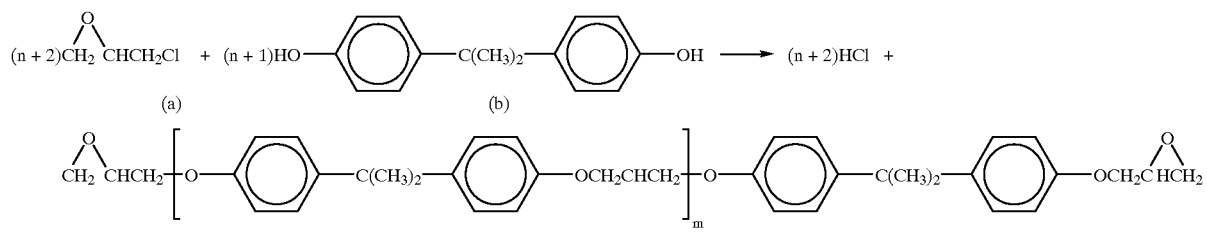

The reaction actually involves the sodium salt of bisphenol A since the polymerization is carried out in the presence of an equivalent of sodium hydroxide. The typical reaction temperatures are in the range of 50–95° C.

Either liquid or solid prepolymers can be produced by control of molecular weight, e.g., "m" less than 1 for liquid prepolymers and "n" in the range of 2–30 for solid prepolymers. The epichlorohydrin can be reacted with a variety of hydroxyl, carboxyl and amine compounds to form monomers with two or more epoxide groups.

A generic representation of the structure of suitable epoxy resins is described below

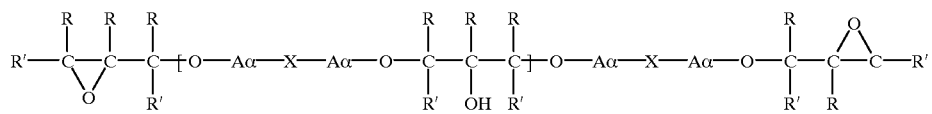

wherein:
  R, R'=H or $C_nH_{2n+1}$ where n=1–6
  Aα=cyclic or aromatic and may contain substituted derivatives such as acids and salts

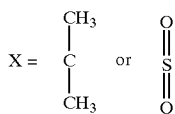

Examples of suitable commercially available epoxy resins include but are not limited to "Epon" resins available from Shell, and "Novolac" resins from Dow.

Suitable polyethylenes for forming the cover and/or intermediate layer include homo and copolymers of ethylene containing functional groups such as maleic anhydride, carboxylic acid and hydroxyl groups. For example, these functional groups are introduced by either chemical grafting as in the case of grafting maleic anhydride such as that sold commercially under the tradename "FUSABOND" by DuPont (Canada). Additionally, such functional groups can be introduced by copolymerizing the ethylene monomer with an unsaturated carboxylic acid comonomer such as a methacrylic acid sold commercially under the tradename "NUCREL" by DuPont.

Homo and copolymers of polyethylenes employed in the present invention can be produced by well known free radical and ionic polymerization methods, including those employing a metallocene based catalyst. A general, non-limiting representation of the structure of copolymers of ethylenes suitable for the present invention is:

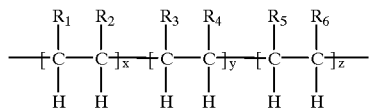

Wherein:
  X=1 to 100;
  Y=0 to 50;
  z=0 to 50
  $R_1$, $R_2$, $R_3$, and $R_5$ are hydrogen or $C_nH_{2n+1}$ wherein n=1 to 5;
  $R_4$ and $R_6$ are hydrogen or $C_nH_{2n+1}$ wherein n=1 to 12.

Polyesters suitable for use in the present invention can be produced by direct esterification of a diacid with a diol (as set forth below) or self-condensation of a hydroxy carboxylic acid. For example, a reaction of diacylchloride with a diol(s) at lower temperatures can be used to produce polyesters.

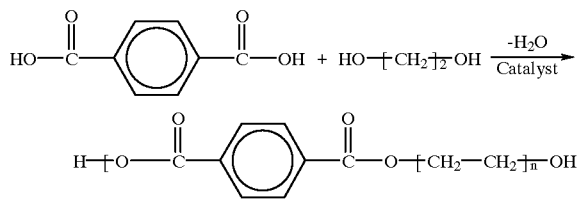

Catalysts such as manganese acetate, antimony oxide and titanium alkoxides are commonly used in the polymerization to produce polyesters. A generic representation of the structure of suitable polyesters is set forth below.

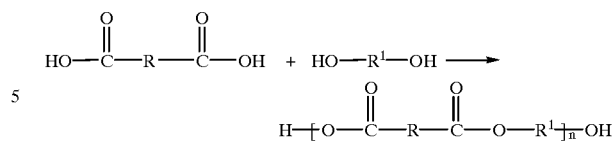

Wherein:
  R=substituted and unsubstituted cycloaliphatic or aromatic;
  $R^1$=aliphatic or aromatic (e.g. bisphenol—A or bispherol—S); and n>50

Examples of suitable commercially available polyesters include materials sold under the tradenames "Eastpak" PET polyester and "Eastar" PETG from Eastman Chemicals, "Dacron" and "Terglene" from DuPont and PTT (polytrimethylene terephthatate) from Shell just to name a few.

Examples of other specific polymers or families of polymers which can be used in conjunction with the anionic polyurethane/polyurea ionomers of the claimed invention in golf ball cover compositions and/or intermediate layer compositions include: poly(ethylethylene), poly(heptylethylene), poly(hexyldecylethylene), poly(isopentylethylene), poly(1,1-dimethyltrimethylene), poly(1,1,2-trimethyltrimethylene), aliphatic polyketones (such as ethylene-carbon monoxide copolymer sold commercially under the tradename "Carilon" by Shell), poly(butyl acrylate), poly(4-cyanobutyl acrylate), poly(2-ethylbutyl acrylate), poly(heptyl acrylate), poly(2-methylbutyl acrylate), poly(3-methylbutyl acrylate), poly(N-octadecylacrylamide), poly(octadecyl methacrylate), poly(butoxyethylene), poly(methoxyethylene), poly(pentyloxyethylene), poly(1,1-dichloroethylene), poly(cyclopentylacetoxyethylene), poly(4-dodecylstyrene), poly(4-tetradecylstyrene), poly(oxyethylethylene), poly(oxytetramethylene), poly(oxytrimethylene), poly(oxycarbonylpentamethylene), poly(oxycarbonyl-3-methylpentamethylene), poly(oxycarbonyl-1,5-dimethylpentamethylene), poly(silanes), poly(silazanes), poly(furan tetracarboxylic acid diimides), and poly(vinylidene fluoride), as well as the classes of polymers to which they belong.

Among the preferred polymers which can be combined with the anionic polyurethanes/polyurea ionomers of the claimed invention in forming golf ball covers and/or intermediate layers are: block poly(ether-ester) copolymers, such as HYTREL® available from DuPont, block poly(ether-amide) copolymers, such as PEBAX® available from Elf Atochem, styrene-butadiene-styrene block copolymers, such as the KRATON D® grades available from Shell Chemical, partially or fully hydrogenated styrene-butadiene-styrene block copolymers such as, styrene-(ethylene-propylene)-styrene or styrene-(ethylene-butylene)-styrene block copolymers, available from Shell Chemical as KRATON G® series, Septon HG-252 from Kurary, either of the KRATON®-type copolymers with maleic anhydride or sulfonic graft or hydroxyl functionality, such as the KRATON FD® or KRATON FG® series available from Shell Chemical, olefinic copolymers, such as the ethylene-methyl acrylate or ethylene-butyl acrylate series available from Quantum Chemical, ethylene-octene copolymers made with metallocene catalysts, such as the AFFINITY® or ENGAGE® series available from Dow, ethylene-alpha olefin copolymers and terpolymers made from metallocene catalysts, such as the EXACT® series available from Exxon, block poly(urethane-ester) or block poly(urethane-ether) or block poly(urethane-caprolactone), such as the ESTANE® series available from BF Goodrich, polyethylene glycol, such as CARBOWAX® available from Union Carbide, polycaprolactone, polycaprolactam, polyesters, such as EKTAR® available from Eastman, polyamides, such as nylon 6 or nylon 6,6, available from DuPont and ICI, ethylene-propylene-(diene monomer) terpolymers and their sulfonated or carboxylated derivatives, and SANTOPRENE® from Monsanto.

The polymer blends of this invention can be prepared with or without the addition of a compatibilizer and with varying molecular architecture of blend components, such as varying molecular weight, tacticity, degrees of blockiness, etc., as is well known to those knowledgeable in the art of blending polymers.

Preferably, the stock used to make a golf ball cover or intermediate layer in accordance with the present invention is a blend of the anionic polyurethane/polyurea ionomers of the present invention and another polymer selected from those described above. Blending of the polymers is accomplished in a conventional manner using conventional equipment. Good results have been obtained by mixing the polymers or resins in a solid, pelletized form and then placing the mix into a hopper which is used to feed the heated barrel of an injection molding machine. Further mixing is accomplished by a screw in the heated barrel. The injection molding machine is used either to make preformed half-shells for compression molding about a core or for molding flowable cover stock about a core using a retractable-pin mold. Such machines are conventional.

Additionally, conventional components which can be added to the cover compositions of the present invention include white pigment such as $TiO_2$, ZnO, optical brighteners, metals, surfactants, processing aids, U.V. stabilizers such as TINUVIN™ 213 and TINUVIN™ 328, for example. Also, light stabilizers such as, for example, TINUVIN™ 770 and TINUVIN™ 765, may be included. TINUVIN™ products are available from Ciba-Geigy. Dyes, as well as optical brighteners and fluorescent pigments may also be included in the golf ball covers produced with polymers formed according to the present invention. Such additional ingredients may be added in any amounts that will achieve their desired purpose.

Other conventional ingredients, e.g., fillers are well known to the person of ordinary skill in the art and may be included in cover and intermediate layer blends of the present invention in amounts effective to achieve their known purpose.

An optional filler component may be chosen to impart additional density to blends of the previously described components. The selection of such filler(s) is dependent upon the type of golf ball desired (i.e., one-piece, two-piece multilayer or wound), as will be more fully detailed below. Generally, the filler will be inorganic, having a density greater than about 2 g/cc, preferably greater than 4 g/cc, and will be present in amounts between 5 and 65 weight percent based on the total weight of the polymer components. Examples of useful fillers include zinc oxide, barium sulfate, lead silicate and tungsten carbide, as well as the other well known corresponding salts and oxides thereof.

Golf Ball Cores

A representative elastomer base composition for forming a golf ball core prepared in accordance with the present invention comprises polybutadiene as the elastomer and, in parts by weight based on 100 parts polybutadiene (pph), 20–50 pph of a metal salt acrylate such as diacrylate, dimethacrylate, or monomethacrylate, preferably zinc diacrylate and up to about 50 pph of at least one anionic polyurethane/polyurea ionomer.

The polybutadiene preferably has a cis 1,4 content of above about 90% and more preferably above about 96%. Commercial sources of polybutadiene include Shell 1220 manufactured by Shell Chemical, Neocis BR40 manufactured by Enichem Elastomers, and Ubepol BR150 manufactured by Ube Industries, Ltd. If desired, the polybutadiene can also be mixed with other elastomers known in the art, such as natural rubber, styrene butadiene rubber, and/or polyisoprene in order to further modify the properties of the core. When a mixture of elastomers is used, the amounts of other constituents in the core composition are based on 100 parts by weight of the total elastomer mixture.

Metal salt diacrylates, dimethacrylates, and monomethacrylates suitable for use in this invention include those wherein the metal is magnesium, calcium, zinc, aluminum, sodium, lithium or nickel. Zinc diacrylate is preferred, because it has been found to provide golf balls with a high initial velocity in the USGA test. The zinc diacrylate can be of various grades of purity. For the purposes of this invention, the lower the quantity of zinc stearate present in the zinc diacrylate, the higher the zinc diacrylate purity. Zinc diacrylate containing less than about 10% zinc stearate is preferable. More preferable is zinc diacrylate containing about 4–8% zinc stearate. Suitable, commercially available zinc diacrylates include those from Mitsui and Sartomer. The preferred concentrations of zinc diacrylate that can be used are 20–50 pph based upon 100 pph of polybutadiene or alternately, polybutadiene with a mixture of other elastomers that equal 100 pph.

Free radical initiators are used to promote cross-linking of the metal salt diacrylate, dimethacrylate, or monomethacrylate and the polybutadiene. Suitable free radical initiators for use in the invention include, but are not limited to peroxide compounds, such as dicumyl peroxide, 1,1-di(t-butylperoxy) 3,3,5-trimethyl cyclohexane, a-a bis (t-butylperoxy)diisopropylbenzene, 2,5-dimethyl-2,5 di (t-butylperoxy) hexane, or di-t-butyl peroxide, and mixtures thereof. Other useful initiators would be readily apparent to one of ordinary skill in the art without any need for experimentation. The initiator(s) at 100% activity are preferably added in an amount ranging between about 0.05 and 2.5 pph based upon 100 parts of butadiene, or butadiene mixed with one or more other elastomers. More preferably, the amount of initiator added ranges between about 0.15 and 2 pph and most preferably between about 0.25 and 1.5 pph.

Typical golf ball cores incorporate 5 to 50 pph of zinc oxide in the zinc diacrylate-peroxide cure system that cross-links polybutadiene during the core molding process.

In the present invention, anionic polyurethane/polyurea ionomers may be added to blends of such core compositions in any amount which imparts the advantageous properties to the core and/or finished ball discussed herein. A single anionic polyurethane/polyurea ionomer or a blend of two or more different anionic polyurethane/polyurea ionomers may be employed in the present invention. The anionic polyurethane/polyurea ionomer may be present in an amount of about up to about 50 pph. Preferably, the anionic polyurethane/polyurea ionomer is present in an amount of about 1 to about 30 pph. More preferably, the anionic polyurethane/polyurea is present in an amount of about 5 to about 25 pph.

The core compositions of the present invention may also include fillers, added to the elastomeric composition to adjust the density and/or specific gravity of the core. As used herein, the term "fillers" includes any compound or composition that can be used to vary the density and/or hardness properties of the subject golf ball core. Fillers useful in the golf ball core according to the present invention include, for example, zinc oxide, barium sulfate, and regrind (which is recycled core molding matrix ground to 30 mesh particle size). The amount and type of filler utilized is governed by the amount and weight of other ingredients in the composition, since a maximum golf ball weight of 1.620 ounces (45.92 gm) has been established by the USGA. Appropriate fillers generally have a specific gravity in the range of from about 2.0 to 5.6.

Antioxidants may also be included in the elastomer cores produced according to the present invention. Antioxidants are compounds which prevent the breakdown of the elastomer. Antioxidants useful in the present invention include, but are not limited to, quinoline type antioxidants, amine type antioxidants, and phenolic type antioxidants.

Other ingredients such as accelerators, e.g. tetra methylthiuram, processing aids, processing oils, plasticizers, dyes and pigments, as well as other additives well known to the skilled artisan may also be used in the present invention in amounts sufficient to achieve the purpose for which they are typically used.

The core compositions of the invention may be produced by forming a mixture comprising polybutadiene, zinc diacrylate, and at least one anionic polyurethane/polyurea ionomer. In preparing the core blends, when a set of predetermined conditions is met, i.e., time and temperature of mixing, the free radical initiator is added in an amount dependent upon the amounts and relative ratios of the starting components, all of which would be well understood by one of ordinary skill in the art. In particular, as the components are mixed, the resultant shear causes the temperature of the mixture to rise. Peroxide(s) free radical initiator(s) are blended into the mixture for crosslinking purposes in the molding process.

After completion of the mixing, the golf ball core composition is milled and hand prepped or extruded into pieces ("preps") suitable for molding. The milled preps are then compression molded into cores at an elevated temperature. Typically, 160° C. (320° F.) for 15 minutes is suitable for this purpose. These cores can then be used to make finished golf balls by surrounding the cores with intermediate layer and/or cover materials.

The present invention is directed towards not only cores for use in conventional two-piece and wound golf balls, but also to cores for multilayer golf balls as well. In fact, the present invention contemplates that the presently claimed cores can be employed in golf balls of any construction, wherein the construction includes a solid core.

Coatings for Golf Balls

Protective and decorative coating materials, as well as methods of applying such materials to the surface of a golf ball cover are well known in the golf ball art. Generally, such coating materials comprise urethanes, urethane hybrids, polyesters and acrylics. If desired, more than one coating layer can be used. The polyurethane polyurea ionomers of this invention can be used to form such coatings. Conventionally, a primer layer such as a solvent-based or a water-based polymer may be applied to promote adhesion or to smooth surface roughness before the finish coat(s) are deposited on the golf ball. In general, a cured polyurethane top coat is most widely used as a protective coating material. The coating may be applied to the golf ball cover by an in-mold coating process, such as that described in copending application serial No. 08/665,122, now U.S. Pat. No. 5,849,168 which is incorporated herein by reference.

Golf Ball Manufacture

The polymers of the invention can be used to form any type of golf ball, i.e., one-piece, two-piece, wound or multilayer. In particular, two-piece golf balls comprising a cover surrounding a core are within the scope of the present invention, as are wound golf balls, in which a liquid, semi-solid, or solid core is surrounded by an elastic synthetic winding material. The term "solid cores" as used herein refers not only to one piece cores but also to those cores having a separate solid layer beneath the cover and above the core as disclosed in U.S. Pat. No. 4,431,193 (the disclosure of which is incorporated herein), and other multilayer and/or non-wound cores. Any type of golf ball core can be used in the golf balls of the present invention. Preferred cores, however, include some amount of cis-polybutadiene. The subject polymers may also be used in golf balls having multiple covers and/or multiple cores.

Typically, the covers are formed around the solid or wound cores by either compression molding preformed half-shells of the cover stock material or by injection molding the cover stock about the core. Half-shells are made by injection molding a cover stock into a conventional half-shell mold in a conventional manner.

In compression molding, the half-shells of the stock material at 300° F.–520° F. are formed by injection molding the cover stock material into a conventional half-shell mold for a short time. The preformed half-shells are then placed about a core and the assembly is introduced into a compression molding machine. The compression molding machine is a hydraulic press having an upper and lower mold plate. As taught by U.S. Pat. No. 4,508,309, such mold plates have half molds, each of which is registered with another half mold in the opposite mold plate. It has been found that a golf ball is formed with a cover in accordance with the present invention when the half-shells are compression molded about a core at about 250 to 500° F. The molded balls are then cooled while still in the mold and finally removed when the cover is hard enough to be handled without deforming. The invention can also be practiced using the procedures described in U.S. Pat. Nos. 5,334,673; 5,484,890 and 5,691,066.

Alternatively, the golf balls of the invention can be covered with the use of an injection molding technique utilizing an injection molding machine in which the core assembly is placed in a mold cavity. The core assembly is held in place through the use of several retractable pins. Such injection molding machines are well known in the art. The molten cover material is injected into the cavity surrounding the core. As the cover material cools and hardens, the pins retract and the molded ball is ejected from the mold. The balls then undergo conventional finishing operations such as buffing, painting and stamping. This type of cover construction is generally referred to as a one-piece cover.

The present invention can be used in forming golf balls of any desired size. "The Rules of Golf" by the USGA dictates that the size of a competition golf ball to more than 1.680 inches in diameter, although golf balls of any size can be used for leisure golf play. The preferred diameter of the golf balls is from about 1.680 inches to about 1.800 inches. The more preferred diameter is from about 1.680 inches to about 1.760 inches. A diameter of from about 1.680 inches to about 1.740 inches is most preferred, however diameters anywhere in the range of from 1.68 to about 1.95 inches can be used. Oversize golf balls with diameters above about 1.760 inches to as big as 2.75 inches are also within the scope of the present invention.

Preferred embodiments of the balls of the invention are shown in FIGS. 1–4. In FIG. 1, the golf ball 1 comprises a core 2 of conventional materials and a cover 3 comprising an anionic polyurethane or polyurea.

Figure 2:
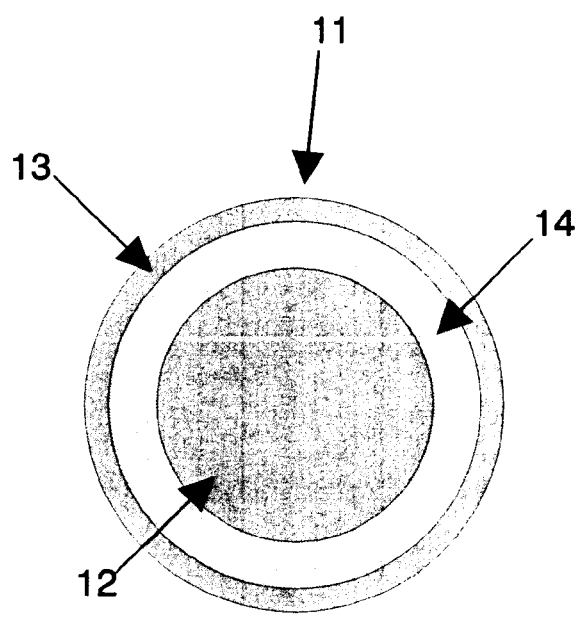
FIG. 2 is a cross-sectional view of a multi-piece golf ball wherein at least one intermediate layer is formed from a composition comprising at least one anionic polyurethane/polyurea ionomer.

FIG. 2 illustrates a multi-piece golf ball 11, which comprises a cover 13, at least one intermediate layer 14 and a core 12. The intermediate layer contains an anionic polyurethane or polyurea.

Figure 3:
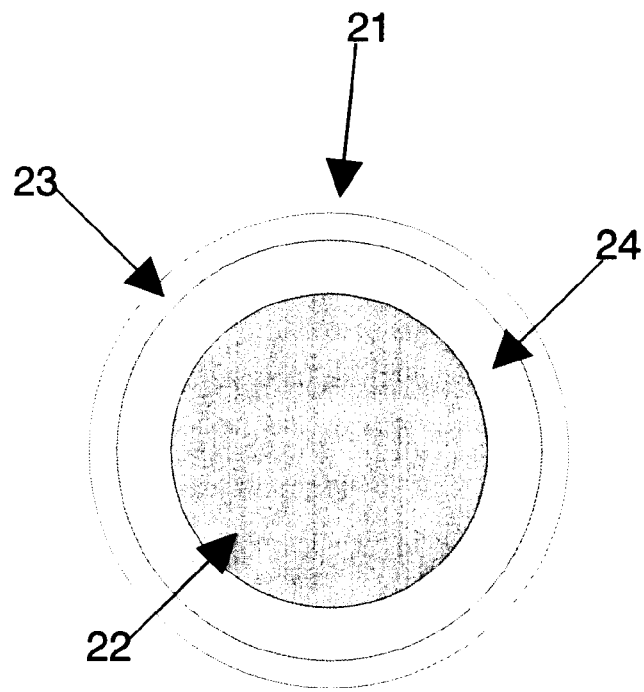
FIG. 3 is a cross-sectional view of a multi-piece golf ball wherein the cover and at least one intermediate layer are formed from a composition comprising at least one anionic polyurethane/polyurea ionomer.

The golf ball 21 of FIG. 3 has a core 22 made of conventional materials, and at least one intermediate layer 24 and cover 23 comprising an anionic polymethane or polyurea.

Figure 4:
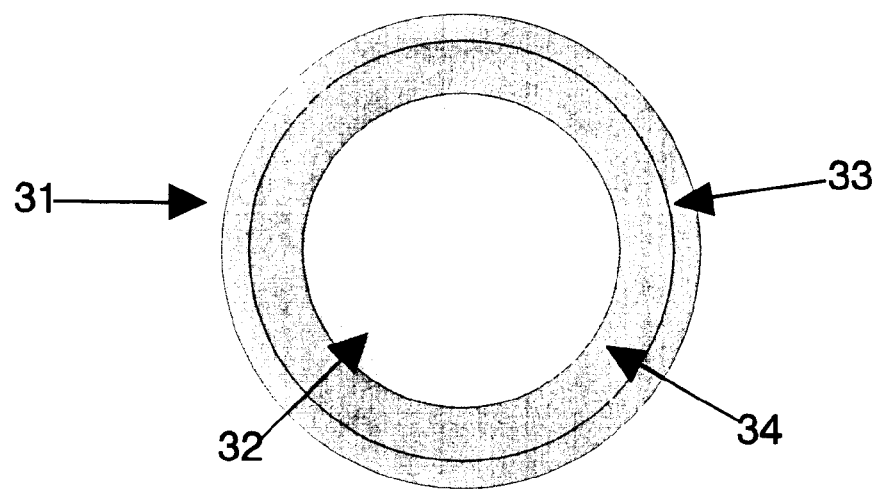
FIG. 4 is a cross-sectional view of a multi-piece golf ball wherein the core is formed from a composition comprising at least one anionic polyurethane/polyurea ionomer.

In FIG. 4, the golf ball 31 comprises a core 32 comprising an anionic polyurethane or polyurea, and an intermediate layer 34 and cover 33 of conventional materials.

All patents, articles and patent applications cited in the foregoing text are expressly incorporated herein by reference in their entirety.

It will be understood that the claims are intended to cover all changes and modifications of the preferred embodiments of the invention, herein chosen for the purpose of illustration, which do not constitute a departure from the spirit and scope of the invention.

What is claimed is:

1. A golf ball comprising a cover with at least one cover layer and a core with at least one core layer, wherein at least one of said cover or said core layers is formed from a composition comprising at least one anionic polyurethane or polyurea ionomer, or copolymers thereof.

2. The golf ball of claim 1 wherein said anionic polyurethane or polyurea ionomer comprises an anionic group selected from the group consisting of a sulfonate group, a carboxylate group and a phosphonate group.

3. The golf ball of claim 1 wherein said anionic polyurethane ionomer has a formula:

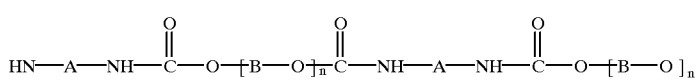

M=a group IA, IB, IIA, IIB, IIIA, IIIB, IVA, IVB, VA, VB, VIA, VIB, VIIB or VIIIB metal x=1 to 5

B=a straight chain or branched aliphatic group, a substituted straight chain or branched aliphatic group, or an aromatic or substituted aromatic group n=1 to 100.

4. The golf ball of claim 1 wherein $M^{+x}$ is selected from the group consisting of $Li^+$, $Na^+$, $K^+$, $Mg^{+2}$, $Zn^{+2}$, $Ca^{+2}$, $Mn^{+2}$, $Al^{+3}$, $Ti^{+x}$, $Zr^{+x}$, $W^{+x}$ or $Hf^{+x}$.

5. The golf ball of claim 1 wherein said anionic polyurethane ionomer has a formula:

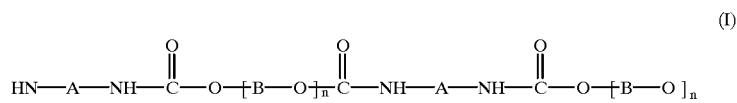

where

A=a straight chain or branched aliphatic group, a substituted straight chain or branched aliphatic group, or an aromatic or substituted aromatic group B=R-Z-$M^{+x}$ R=a straight chain or branched aliphatic group, a substituted straight chain or branched aliphatic group, or an aromatic or substituted aromatic group Z=$SO_3^-$, $CO_2^-$ or $HPO_3^-$ M=a group IA, IB, IIA, IIB, IIIA, IIIB, IVA, IVB, VA, VB, VIA, VIB, VIIB or VIIIB metal x=1 to 5 n=1 to 100.

6. The golf ball of claim 5 wherein $M^{+x}$ is selected from the group consisting of $Li^+$, $Na^+$, $K^+$, $Mg^{+2}$, $Zn^{+2}$, $Ca^{+2}$, $Mn^{+2}$, $Al^{+3}$, $Ti^{+x}$, $Zr^{+x}$, $W^{+x}$ or $Hf^{+x}$.

7. The golf ball of claim 1 wherein said anionic polyurea ionomer has a formula:

where
A=R-Z-$M^{+x}$
R=a straight chain or branched aliphatic group, a substituted straight chain or branched aliphatic group, or an aromatic or substituted aromatic group
Z=$SO_3^-$, $CO_2^-$ or $HPO_3^-$

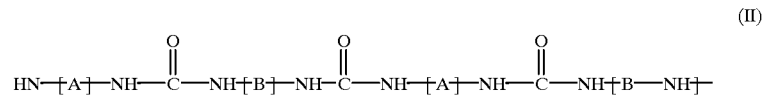

where

A=R-Z-M$^{+x}$

R=a straight chain or branched aliphatic group, a substituted straight chain or branched aliphatic group, or an aromatic or substituted aromatic group Z=SO$_3^-$, CO$_2^-$ or HPO$_3^-$ M=a group IA, IB, IIA, IIB, IIIA, IIIB, IVA, IVB, VA, VB, VIA, VIB, VIIB or VIIIB metal x=1 to 5

B=a straight chain or branched aliphatic group, a substituted straight chain or branched aliphatic group, or an aromatic or substituted aromatic group.

8. The golf ball of claim 7 wherein M$^{+x}$ is selected from the group consisting of Li$^+$, Na$^+$, K$^+$, Mg$^{+2}$, Zn$^{-2}$, Ca$^{+2}$, Mn$^{+2}$, Al$^{+3}$, Ti$^{+x}$, Zr$^{+x}$, W$^{+x}$ or Hf$^{+x}$.

9. The golf ball of claim 1 wherein said anionic polyurea ionomer has a formula:

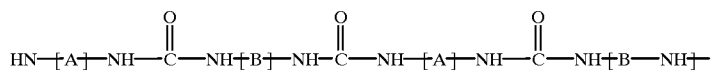

(II)

where

A=a straight chain or branched aliphatic group, a substituted straight chain or branched aliphatic group, or an aromatic or substituted aromatic group B=R-Z-M$^{+x}$ R=a straight chain or branched aliphatic group, a substituted straight chain or branched aliphatic group, or an aromatic or substituted aromatic group Z=SO$_3^-$, CO$_2^-$ or HPO$^{3-}$ M=a group IA, IB, IIA, IIB, IIIA, IIIB, IVA, IVB, VA, VB, VIA, VIB, VIIB or VIIIB metal x=1 to 5.

10. The golf ball of claim 9 wherein M$^{+x}$ is selected from the group consisting of Li$^+$, Na$^+$, K$^+$, Mg$^{+2}$, Zn$^{+2}$, Ca$^{+2}$, Mn$^{+2}$, Al$^{+3}$, Ti$^{+x}$, Zr$^{+x}$, W$^{+x}$ or Hf$^{+x}$.

11. The golf ball of claim 1 wherein said anionic polyurethane or polyurea ionomer comprises a sulfonated or carboxylated derivative of a material selected from the group consisting of an aromatic diisocyanate monomer, an aliphatic diisocyanate monomer, a polyol monomer and an organic amine monomer.

12. The golf ball of claim 1, wherein the composition further comprises at least one additional thermoplastic or thermoset component, wherein the at least one additional component is a compound selected from the group consisting of non-anionic polyurethanes, epoxy resins, polyethylenes, polyamides, polyesters, acid copolymers or their ionomer derivatives or blends thereof.

13. The golf ball of claim 12, wherein the composition comprises from about 1 to about 75 weight percent of the anionic polyurethane or polyurea ionomer, or copolymers thereof, and at least about 25 weight percent of the additional component.

14. The golf ball of claim 12, wherein the additional component is selected from the group consisting of an acid copolymer, its ionomer derivative and a polyamide.

15. The golf ball of claim 1, wherein the golf ball further comprises at least one intermediate layer interposed between the cover and at least one core layer, wherein said intermediate layer is formed from a composition which comprises at least one anionic polyurethane or polyurea ionomer, or copolymers thereof.

16. The golf ball of claim 1 wherein the anionic polyurethane or polyurea ionomer is foamed.

17. A golf ball comprising a cover, a core and at least one intermediate layer interposed between the cover and the core, wherein the intermediate layer is formed from a composition comprising at least one anionic polyurethane or polyurea ionomer, or copolymers thereof.

18. The golf ball of claim 17 wherein said anionic polyurethane or polyurea ionomer comprises an anionic group selected from the group consisting of a sulfonate group, a carboxylate group and a phosphonate group.

19. The golf ball of claim 17 wherein said anionic polyurethane ionomer has a formula:

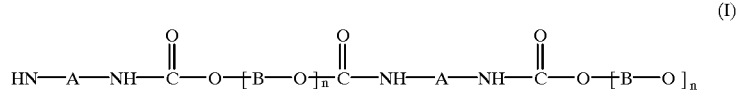

(I)

where

A=R-Z-M$^{+x}$

R=a straight chain or branched aliphatic group, a substituted straight chain or branched aliphatic group, or an aromatic or substituted aromatic group Z=SO$_3^-$, CO$_2^-$ or HPO$_3^-$ M=a group IA, IB, IIA, IIB, IIIA, IIIB, IVA, IVB, VA, VB, VIA, VIB, VIIB or VIIIB metal x=1 to 5

B=a straight chain or branched aliphatic group, a substituted straight chain or branched aliphatic group, or an aromatic or substituted aromatic group n=1 to 100.

20. The golf ball of claim 19 wherein M$^{+x}$ is selected from the group consisting of Li$^+$, Na$^+$, K$^+$, Mg$^{+2}$, Zn$^{+2}$, Ca$^{+2}$, Mn$^{+2}$, Al$^{+3}$, Ti$^{+x}$, Zr$^{+x}$, W$^{+x}$ or Hf$^{+x}$.

21. The golf ball of claim 17 wherein said anionic polyurethane ionomer has a formula

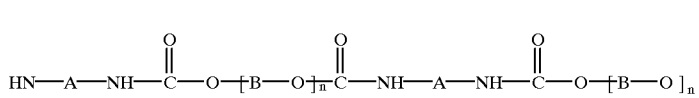

(I)

where
   A=a straight chain or branched aliphatic group, a substituted straight chain or branched aliphatic group, or an aromatic or substituted aromatic group
   B=R-Z-M$^{+x}$
   R=a straight chain or branched aliphatic group, a substituted straight chain or branched aliphatic group, or an aromatic or substituted aromatic group
   Z=SO$_3^-$, CO$_2^-$ or HPO$_3^-$
   M=a group IA, IB, IIA, IIB, IIIA, IIIB, IVA, IVB, VA, VB, VIA, VIB, VIIB or VIIIB metal
   x=1 to 5
   n=1 to 100.

22. The golf ball of claim 21 wherein M$^{+x}$ is selected from the group consisting of Li$^+$, Na$^+$, K$^+$, Mg$^{+2}$, Zn$^{+2}$, Ca$^{+2}$, Mn$^{+2}$, Al$^{+3}$, Ti$^{+x}$, Zr$^{+x}$, W$^{+x}$ or Hf$^{+x}$.

23. The golf ball of claim 17 wherein said anionic polyurea ionomer has a formula

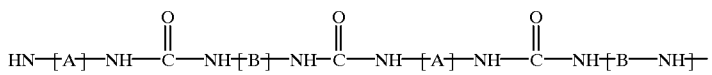

(II)

where
   A=R-Z-M$^{+x}$
   R=a straight chain or branched aliphatic group, a substituted straight chain or branched aliphatic group, or an aromatic or substituted aromatic group
   Z=SO$_3^-$, CO$_2^-$ or HPO$_3^-$
   M=a group IA, IB, IIA, IIB, IIIA, IIIB, IVA, IVB, VA, VB, VIA, VIB, VIIB or VIIIB metal
   x=1 to 5
   B=a straight chain or branched aliphatic group, a substituted straight chain or branched aliphatic group, or an aromatic or substituted aromatic group.

24. The golf ball of claim 23 wherein M$^{+x}$ is selected from the group consisting of Li$^+$, Na$^+$, K$^+$, Mg$^{+2}$, Zn$^{+2}$, Ca$^{+2}$, Mn$^{+2}$, Al$^{+3}$, Ti$^{+x}$, Zr$^{+x}$, W$^{+x}$ or Hf$^{+x}$.

25. The golf ball of claim 17 wherein said anionic polyurea ionomer has a formula R=a straight chain or branched aliphatic group, a substituted straight chain or branched aliphatic group, or an aromatic or substituted aromatic group
   Z=SO$_3^-$, CO$_2^-$ or HPO$_3^-$
   M=a group IA, IB, IIA, IIB, IIIA, IIIB, IVA, IVB, VA, VB, VIA, VIB, VIIB or VIIIB metal
   x=1 to 5.

26. The golf ball of claim 25 wherein M$^{+x}$ is selected from the group consisting of Li$^+$, Na$^+$, K$^+$, Mg$^{+2}$, Zn$^{+2}$, Ca$^{+2}$, Mn$^{+2}$, Al$^3$, Ti$^{+x}$, Zr$^{+x}$, W$^{+x}$ or Hf$^{+x}$.

27. The golf ball of claim 17 wherein said anionic polyurethane or polyurea ionomer comprises a sulfonated or carboxylated derivative of a material selected from the group consisting of an aromatic diisocyanate monomer, an aliphatic diisocyanate monomer, a polyol monomer and an organic amine monomer.

28. The golf ball of claim 17, wherein the composition further comprises at least one additional thermoplastic or thermoset component, wherein the additional component is a compound selected from the group consisting of non-anionic polyurethanes, epoxy resins, polyethylenes, polyamides, polyesters, acid copolymers or their ionomer derivatives or blends thereof.

29. The golf ball of claim 28, wherein the composition comprises from about 1 to about 75 weight percent of the anionic polyurethane or polyurea ionomer or copolymers thereof, and at least about 25 weight percent of the additional component.

30. The golf ball of claim 28, wherein the additional component is selected from the group consisting of an acid copolymer, its ionomer derivative and a polyamide.

31. The golf ball of claim 1, wherein said at least one core layer further comprises an elastomer.

32. The golf ball of claim 1, wherein said at least one layer core further comprises a polybutadiene and a metal salt acrylate.

33. The golf ball of claim 31, wherein the anionic polyurethane or polyurea ionomer is present in the core in an amount of up to about 50 parts per hundred parts elastomer.

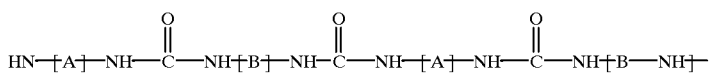

(II)

where
   A=a straight chain or branched aliphatic group, a substituted straight chain or branched aliphatic group, or an aromatic or substituted aromatic group.
   B=R-Z-M$^{+x}$ 34. The golf ball of claim 1 wherein the golf ball is a wound ball which further comprises a layer of elastic thread disposed between the cover and the core.

35. The golf ball of claim 1 wherein said core is selected from the group consisting of liquid filled cores, solid cores and hollow cores.

36. A golf ball comprising a cover having an outer surface and at least one core layer wherein at least a portion of the outer surface of the cover is coated by a coating formed from a composition comprising at least one anionic polyurethane or polyurea ionomer, or copolymers thereof.

37. The golf ball of claim 36 wherein said anionic polyurethane or polyurea ionomer comprises an anionic group selected from the group consisting of a sulfonate group, a carboxylate group and a phosphonate group.

38. The golf ball of claim 36 wherein said anionic polyurethane ionomer has a formula:

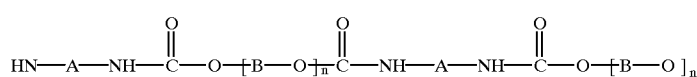
(I)

where

A=R-Z-M$^{+x}$

R=a straight chain or branched aliphatic group, a substituted straight chain or branched aliphatic group, or an aromatic or substituted aromatic group Z=SO$_3^-$, CO$_2^-$ or HPO$_3^-$ M=a group IA, IB, IIA, IIB, IIIA, IIIB, IVA, IVB, VA, VB, VIA, VIB, VIIB or VIIIB metal x=1 to 5

B=a straight chain or branched aliphatic group, a substituted straight chain or branched aliphatic group, or an aromatic or substituted aromatic group n=1 to 100.

39. The golf ball of claim 38 wherein M$^{+x}$ is selected from the group consisting of Li$^+$, Na$^+$, K$^+$, Mg$^{+2}$, Zn$^{+2}$, Ca$^{+2}$, Mn$^{+2}$, Al$^{+3}$, Ti$^{+x}$, Zr$^{+x}$, W$^{+x}$ or Hf$^{+x}$.

40. The golf ball of claim 36 wherein said anionic polyurethane ionomer has a formula:

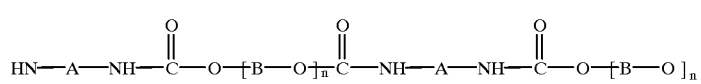
(I)

where

A=a straight chain or branched aliphatic group, a substituted straight chain or branched aliphatic group, or an aromatic or substituted aromatic group B=R-Z-M$^{+x}$ R=a straight chain or branched aliphatic group, a substituted straight chain or branched aliphatic group, or an aromatic or substituted aromatic group Z=SO$_3^-$, CO$_2^-$ or HPO$_3^-$ M=a group IA, IB, IIA, IIB, IIIA, IIIB, IVA, IVB, VA, VB, VIA, VIB, VIIB or VIIIB metal x=1 to 5 n=1 to 100.

41. The golf ball of claim 40 wherein M$^{+x}$ is selected from the group consisting of Li$^+$, Na$^+$, K$^+$, Mg$^{+2}$, Zn$^{+2}$, Ca$^{+2}$, Mn$^{+2}$, Al$^{+3}$, Ti$^{+x}$, Zr$^{+x}$, W$^{+x}$ or Hf$^{+x}$.

42. The golf ball of claim 40 wherein said anionic polyurea ionomer has a formula:

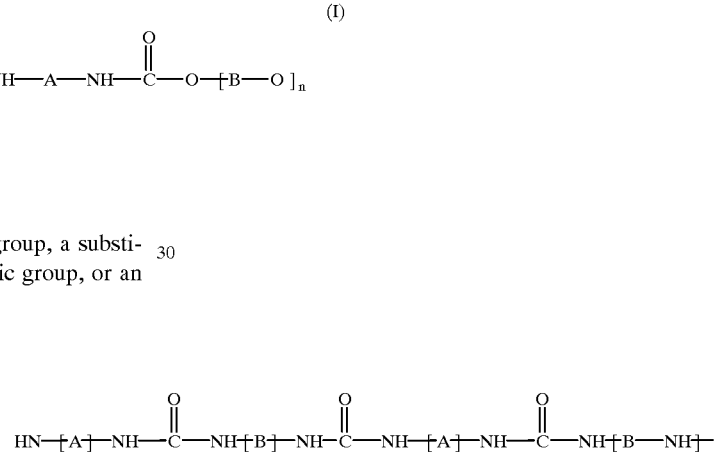
(II)

where

A=R-Z-M$^{+x}$

R=a straight chain or branched aliphatic group, a substituted straight chain or branched aliphatic group, or an aromatic or substituted aromatic group Z=SO$_3^-$, CO$_2^-$ or HPO$_3^-$ M=a group IA, IB, IIA, IIB, IIIA, IIIB, IVA, IVB, VA, VB, VIA, VIB, VIIB or VIIIB metal x=1 to 5

B=a straight chain or branched aliphatic group, a substituted straight chain or branched aliphatic group, or an aromatic or substituted aromatic group.

43. The golf ball of claim 42 wherein M$^{+x}$ is selected from the group consisting of Li$^+$, Na$^+$, K$^+$, Mg$^{+2}$, Zn$^{+2}$, Ca$^{+2}$, Mn$^{+2}$, Al$^{+3}$, Ti$^{+x}$, Zr$^{+x}$, W$^{+x}$ or Hf$^{+x}$.

44. The golf ball of claim 40 wherein said anionic polyurea ionomer has a formula:

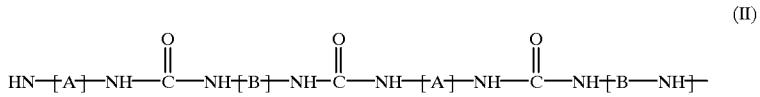

(II)

where
- A = a straight chain or branched aliphatic group, a substituted straight chain or branched aliphatic group, or an aromatic or substituted aromatic group
- B = R-Z-$M^{+x}$
- R = a straight chain or branched aliphatic group, a substituted straight chain or branched aliphatic group, or an aromatic or substituted aromatic group
- Z = $SO_3^-$, $CO_2^-$ or $HPO_3^-$
- M = a group IA, IB, IIA, IIB, IIIA, IIIB, IVA, IVB, VA, VB, VIA, VIB, VIIB or VIIIB metal
- x = 1 to 5.

45. The golf ball of claim 44 wherein $M^{+x}$ is selected from the group consisting of $Li^+$, $Na^+$, $K^+$, $Mg^{+2}$, $Zn^{+2}$, $Ca^{+2}$, $Mn^2$, $Al^3$, $Ti^{+x}$, $Zr^{+x}$, $W^{+x}$ or $Hf^{+x}$.

46. The golf ball of claim 40 wherein said anionic polyurethane or polyurea ionomer comprises a sulfonated or carboxylated derivative of a material selected from an aromatic diisocyanate monomer, an aliphatic diisocyanate monomer, a polyol monomer and an organic amine monomer.

* * * * *